(12) United States Patent
Tange

(10) Patent No.: US 7,204,502 B2
(45) Date of Patent: Apr. 17, 2007

(54) STEERING BEARING ASSEMBLY FOR VEHICLE

(75) Inventor: Satoshi Tange, Osaka (JP)

(73) Assignee: Tange Seiko Taichung Co., Ltd., Taichung (TW)

( * ) Notice: Subject to any disclaimer, the term of this patent is extended or adjusted under 35 U.S.C. 154(b) by 135 days.

(21) Appl. No.: 10/975,846

(22) Filed: Oct. 29, 2004

(65) Prior Publication Data

US 2006/0061058 A1  Mar. 23, 2006

(51) Int. Cl.
  *B62K 21/04* (2006.01)
  *B62K 21/06* (2006.01)
  *F16C 13/00* (2006.01)

(52) U.S. Cl. ............... 280/276; 280/279; 280/280; 384/545

(58) Field of Classification Search ......... 280/274, 280/279, 280, 281.1, 276; 384/537, 538, 384/545
See application file for complete search history.

(56) References Cited

U.S. PATENT DOCUMENTS

| | | | |
|---|---|---|---|
| 4,201,397 A * | 5/1980 | Matthias ............ | 280/280 |
| 5,405,202 A * | 4/1995 | Chi ................... | 384/545 |
| 5,553,511 A * | 9/1996 | Marui ................ | 74/551.1 |
| 5,823,556 A * | 10/1998 | Chi ................... | 280/279 |
| 5,893,574 A * | 4/1999 | Campagnolo ....... | 280/279 |
| 6,431,575 B2 * | 8/2002 | Campagnolo ....... | 280/279 |
| 6,883,818 B1 * | 4/2005 | Chiang .............. | 280/279 |

\* cited by examiner

*Primary Examiner*—Lesley D. Morris
*Assistant Examiner*—Marc A. Scharich
(74) *Attorney, Agent, or Firm*—Browdy and Neimark, PLLC

(57) ABSTRACT

A steering bearing assembly for a vehicle for connecting a steering tube and a frame of the vehicle is disclosed to include a head tube for mounting on the frame of the vehicle and having a tapered face in one end thereof, a bearing mounted in the head tube and formed of an outer race, an inner race, and a plurality of balls mounted in between the outer race and the inner race, the outer race having a protruded retaining portion pressed on the tapered face of the head tube, and a connecting structure for connecting the inner race of the bearing and the steering tube together.

8 Claims, 6 Drawing Sheets

STEERING BEARING ASSEMBLY FOR VEHICLE

BACKGROUND OF THE INVENTION

1. Field of the Invention

The present invention relates generally to a vehicle such as bicycle or tricycle, and more particularly, to a vehicle's steering bearing assembly, which has a compact structure that is easy to manufacture and maintain.

2. Description of the Related Art

A conventional bicycle's steering bearing assembly 1 (as shown in FIG. 7) is provided between the bicycle frame (not shown) and the steering tube 4 for enabling the steering tube 4 to be rotated relative to the bicycle frame. The bicycle frame has a head tube 5 at the front side for accommodating the steering tube 4. The head tube 5 has a top inside annular groove 6 and a bottom inside annular groove 7 that accommodate a top bearing 8 and a bottom bearing 9 respectively. The top inside annular groove 6 has a tapered face 10 at the bottom side for the contact of the tapered face 11 on the outer side of the top bearing 8. The top bearing 8 also has a tapered face 12 on the inside for bearing the tapered face 14 of a compressing member 13. A cap 15 holds down the compressing member 13 between the top bearing 8 and the steering tube 4. Thus, the steering tube 4 can be rotated relative to the head tube 5 (i.e., the bicycle frame).

In the aforesaid design, the processing precision requirement for the top inside annular groove 6 and bottom inside annular groove 7 is critical. For example, if the depth of the tapered face 10 of the top inside annular groove 6 is insufficient, the top bearing 8 will protrude over the head tube 5, thereby allowing entering of dust and water through the gap in between the cap 15 and the head tube 5. On the contrary, excessive depth of the tapered face 10 of the top inside annular groove 6 causes the top bearing 8 to sink in the head tube 5, thereby resulting in interference between the cap 15 and the head tube 5. Therefore, the aforesaid conventional method cannot improve the yielding rate; in consequence the manufacturing cost cannot be effectively reduced.

Further, the head tube 5 wears after a long use. When the top inside annular groove 6 or bottom inside annular groove 7 is deformed, the repair work is complicated and requires much time.

SUMMARY OF THE INVENTION

The present invention has been accomplished under the circumstances in view. It is the main object of the present invention to provide a steering bearing assembly for vehicle, which is easy and inexpensive to manufacture. It is another object of the present invention to provide a steering bearing assembly, which is easy to repair.

To achieve these and other objects of the present invention, the steering bearing assembly for a vehicle for connecting a steering tube and a frame of the vehicle, comprising: a head tube for mounting on the frame of the vehicle and having a tapered face in one end thereof, an bearing mounted in the head tube and formed of an outer race, an inner race, and a plurality of balls mounted in between the outer race and the inner race, the outer race having a protruded retaining portion pressed on the tapered face of the head tube, and connecting means for connecting the inner race of the bearing and the steering tube together.

DETAILED DESCRIPTION OF THE INVENTION

Figure 1:
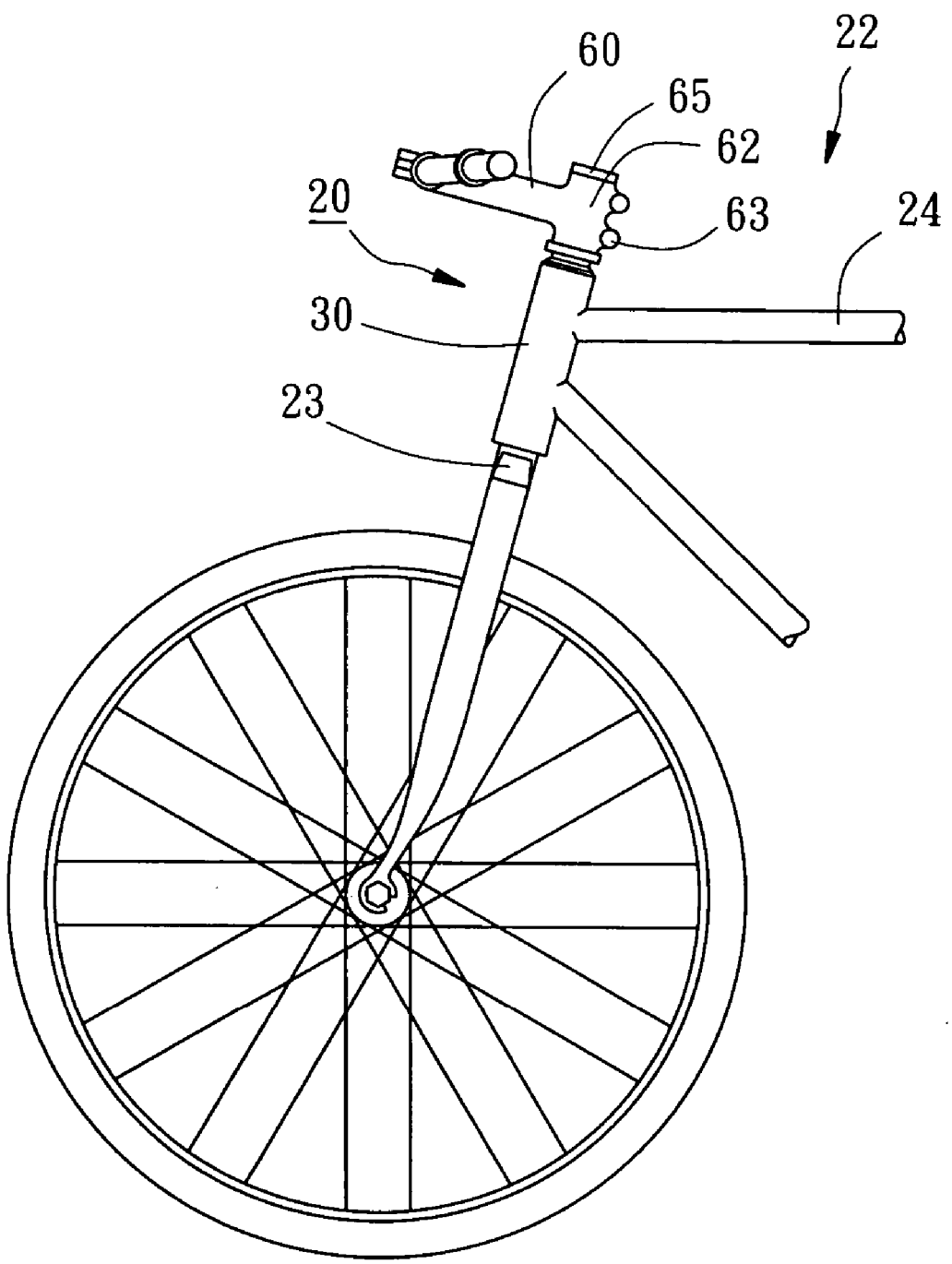
FIG. 1 is a front view showing a steering bearing assembly installed in a vehicle according to a first embodiment of the present invention.
Figure 2:
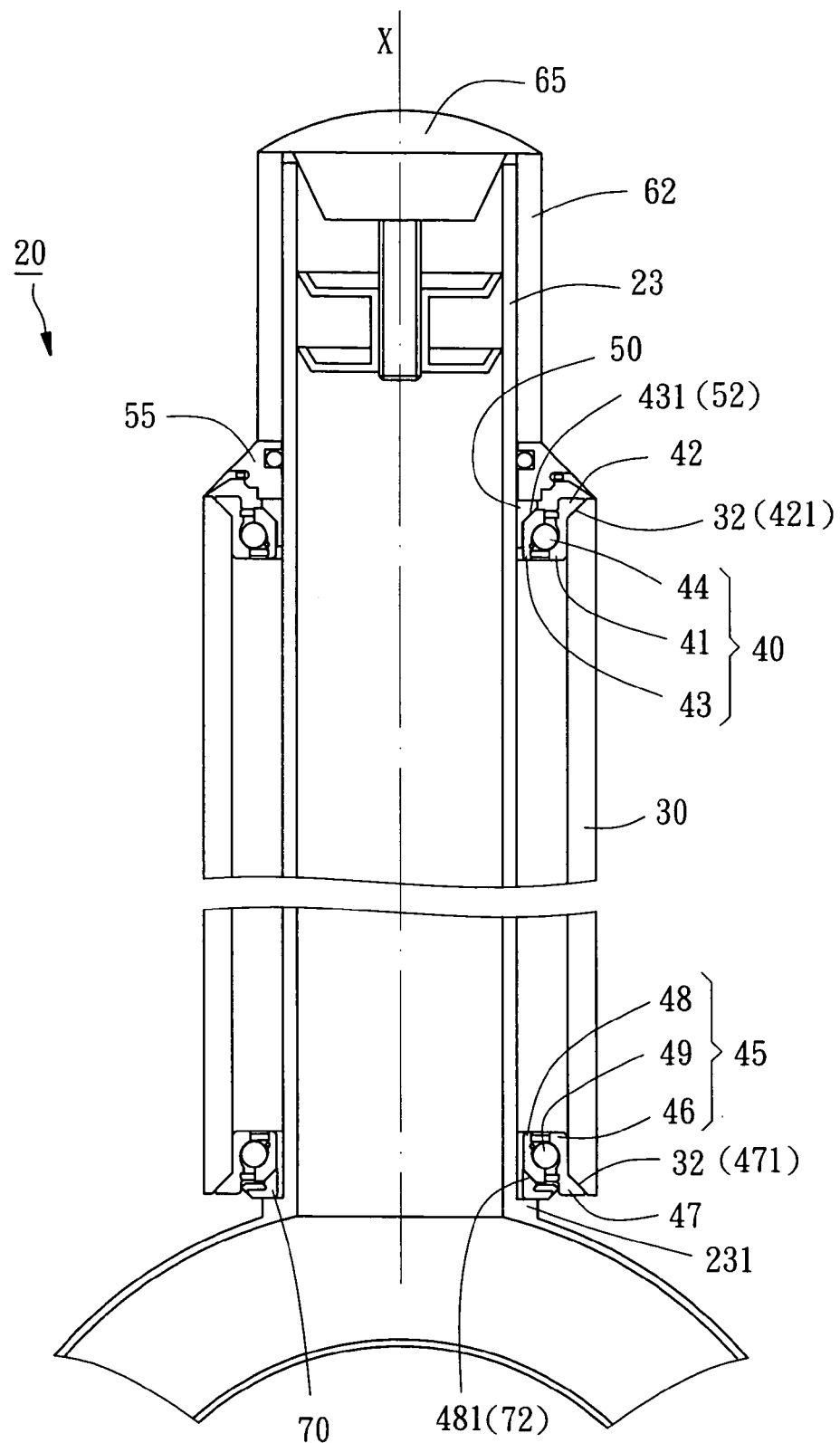
FIG. 2 is a sectional view of the steering bearing assembly according to the first embodiment of the present invention.
Figure 3:
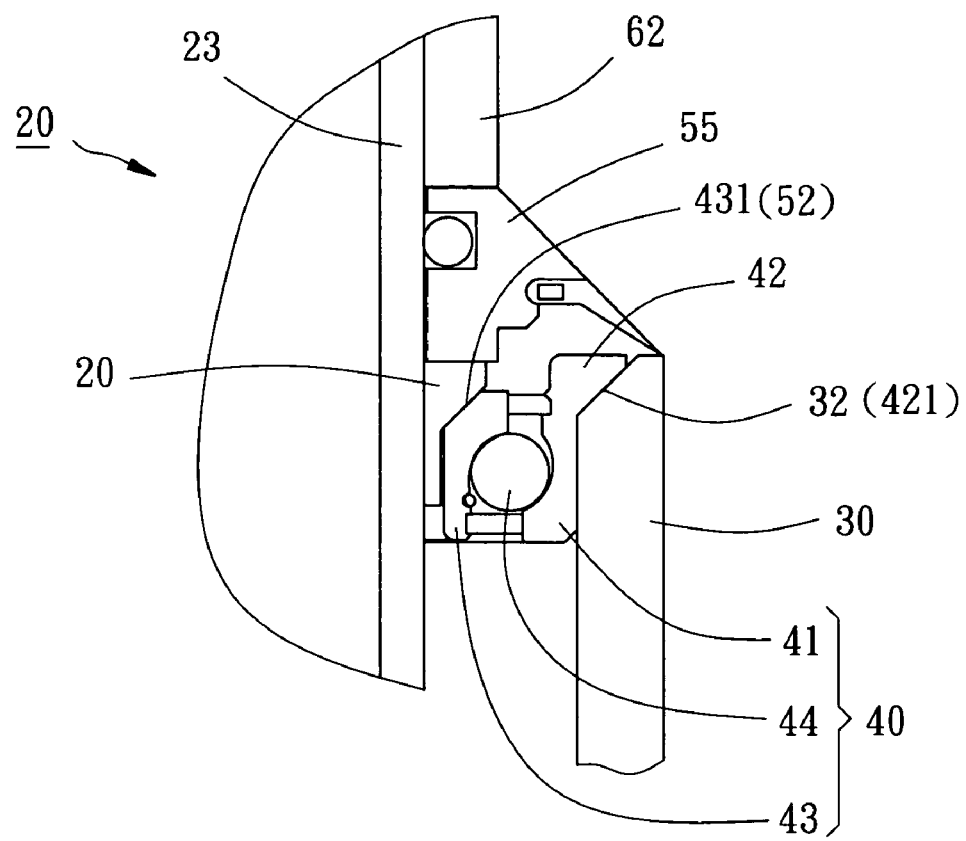
FIG. 3 is an enlarged view of a part of FIG. 2.

Referring to FIGS. 1–3, a steering bearing assembly 20 is shown provided between the steering tube 23 and frame 24 of a vehicle 22, for enabling the steering tube 23 to be rotated relative to the frame 24. The steering bearing assembly 20 comprises a head tube 30, a top bearing 40, a bottom bearing 45, and connecting means for connecting the bearings 40,45 and the steering tube 23.

The head tube 30 is fixedly provided at the front side of the frame 24 of the vehicle 22 for accommodating the steering tube 23, having a tapered face 32 at each of the top and bottom ends thereof. Each tapered face 32 defines with the axis X of the head tube 30 a contained angle ranging from about 30°~60°, preferably 45°.

The top bearing 40 is mounted inside the head tube 30 at the top, comprising an outer race 41, an inner race 43, and balls 44 between the outer race 41 and the inner race 43. The outer race 41 has a protruded retaining portion 42. The protruded retaining portion 42 has a tapered face 421 closely attached to the tapered face 32 at the top end of the head tube 30. The tapered face 421 defines with the axis X of the head tube 30 a contained angle ranging form about 30°~60°, preferably 45°, i.e., equal to the contained angle defined between the tapered face 32 and the axis X of the head tube 30.

The bottom bearing 45 is mounted inside the head tube 30 at the bottom, comprising an outer race 46, an inner race 48, and balls 49 between the outer race 46 and the inner race 48. The outer race 46 has a protruded retaining portion 47. The protruded retaining portion 47 has a tapered face 471 closely attached to the tapered face 32 at the bottom end of the head tube 30. The tapered face 471 defines with the axis X of the head tube 30 a contained angle ranging from about 30°~60°, preferably 45°, i.e., equal to the contained angle defined between the tapered face 32 and the axis X of the head tube 30.

The connecting means for connecting the inner races 43,48 of the bearings 40,45 and the steering tube 23 comprises a compressing ring 50, a cap 55, a first tapered face 431 formed in the inner race 43 of the top bearing 40, the handlebar stem tube 62 of a handlebar assembly 60, a bolt 65, a crown cone 70, and a second tapered face 481 formed in the inner race 48 of the bottom bearing 45.

Figure 4:
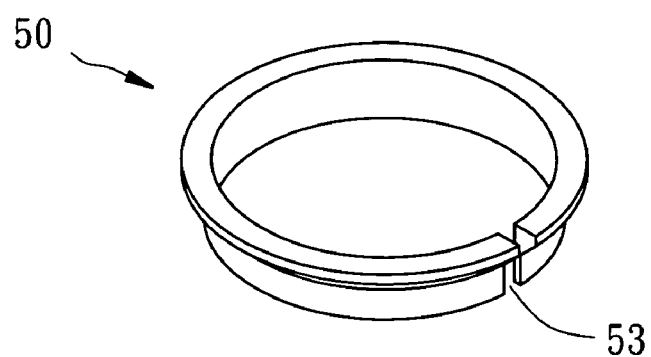
FIG. 4 is a perspective view of a compressing ring for the steering bearing assembly according to the first embodiment of the present invention.

The compressing ring 50 is mounted on the periphery of the steering tube 23, having a tapered face 52, which defines with the axis X of the head tube 30 a contained angle equal to the contained angle defined between the first tapered face 32 and the axis X of the head tube 30 and is maintained closely attached to the tapered face 431 on the inner race 43 of the top bearing 40. Further, the compressing ring 50 is a split ring having a gap 53 (see FIG. 4). The cap 55 is sleeved onto the steering tube 23 and stopped at the top side of the compressing ring 50 to protect the top bearing 40 and the compressing ring 50 against outside dust and water. The handlebar assembly 60 is connected to the steering tube 23 by means of the handlebar stem tube 62. The handlebar stem tube 62 is affixed to the steering tube 23 with two tightening up screws 63. The crown cone 70 is mounted on the periphery of the steering tube 23 and stopped above the bottom flange 231 of the steering tube 23, having a tapered face 72, which defines with the axis X of the head tube 30 a contained angle equal to the contained angle defined between the tapered face 32 and the axis X of the head tube 30 and is maintained closely attached to the tapered face 481 on the inner race 48 of the bottom bearing 45. The bolt 65 is installed in the top of the steering tube 23 to exert a longitudinal force parallel with the axis X of the head tube 30 to the handlebar stem tube 62, the cap 55 and the compressing ring 50, thereby holding down the compressing ring 50 between the steering tube 23 and the inner race 43 of the top bearing 40 to secure the steering tube 23 and the inner race 43 of the top bearing 40 together. The bolt 65 also imparts a longitudinal force parallel with the axis X of the head tube 30 to the crown cone 70 to hold down the crown cone 70 between the steering tube 23 and the inner race 48 of the bottom bearing 45, thereby securing the steering tube 23 and the inner race 48 of the bottom bearing 45 together. By means of the aforesaid arrangement, the steering tube 23 is rotatable relative to the head tube 30.

Because the invention simply needs to process a tapered face 32 on each of two distal ends of the head tube 30, the fabrication of the head tube 30 is easy. Therefore, the yielding rate of the head tube fabrication can be greatly increased, and the manufacturing cost of the head tube 30 can be relatively reduced. When the head tube 30 starts to wear after a long use, the top and bottom ends can be lathed to provide a respective new tapered face subject to the desired slope. This repair work is quite simple.

Further, the protruded retaining portions 42,47 of the top and bottom bearings 40,45 are provided to prevent falling of the top and bottom bearings 40,45 to the inside of the head tube 30. The tapered faces 421,471 are provided for quick positioning of the bearings. These tapered faces are not requisite and may be change to other shapes or eliminated.

The aforesaid connecting means is of the known art and may be variously embodied by means of conventional techniques. The design of the connecting means is to have the inner race of the top bearing and the inner race of the bottom bearing rotatable together with the steering tube. Further, the cap 55 and the handlebar stem tube 62 of a handlebar assembly 60 and the bolt 65 form force means for exerting a longitudinal force to the compressing ring 50 and the crown cone 70. This longitudinal force exerting means is also of the known art and can be variously embodied.

In other words, the steering bearing assembly of the present invention can be variously embodied to achieve the same effect. The aforesaid embodiment is for use in a steering tube without thread. The invention can also be used in a steering tube having outer threads as shown in the following second and third embodiments.

Figure 5:
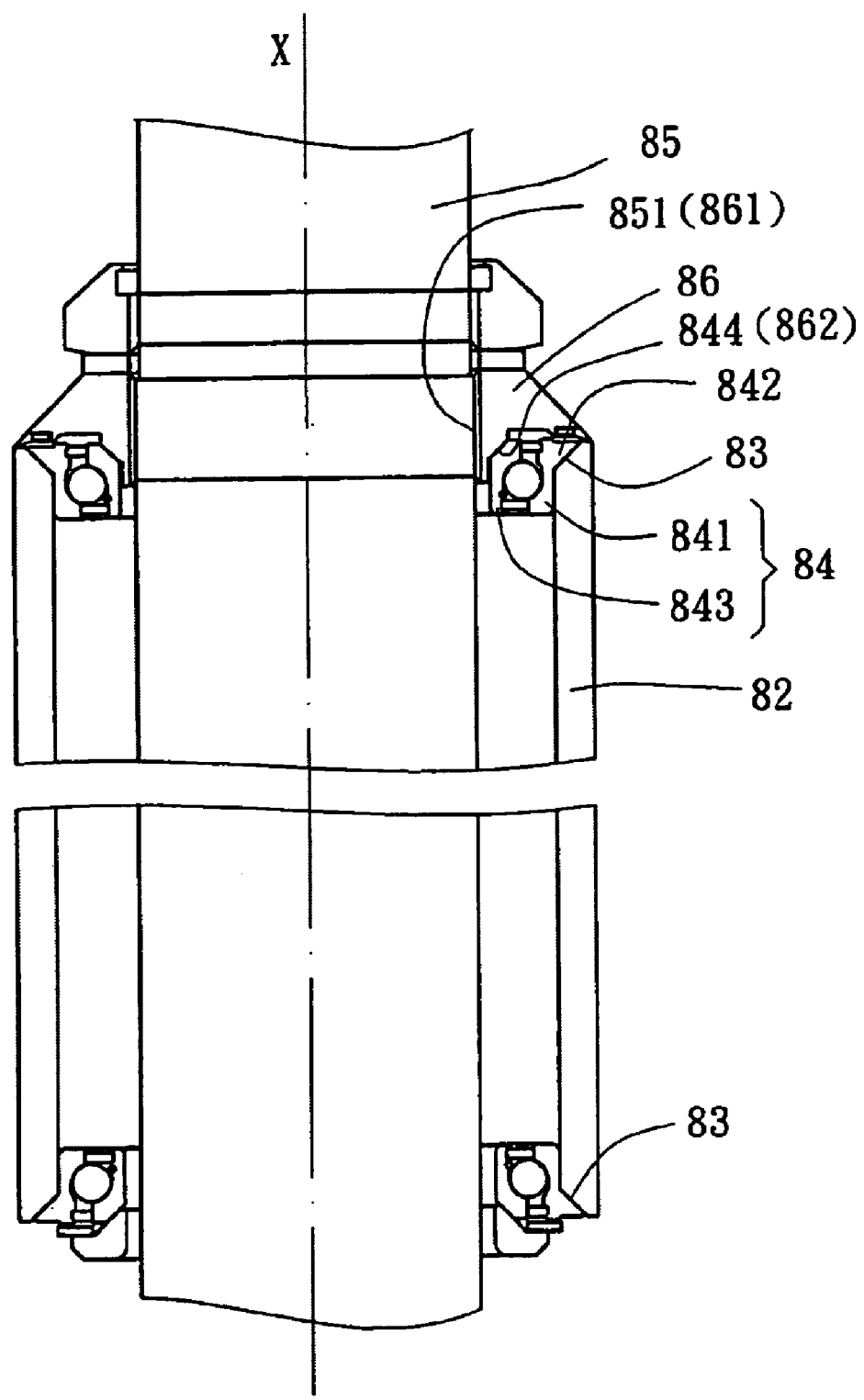
FIG. 5 is a sectional view showing a steering bearing assembly according to a second embodiment of the present invention.

According to the second embodiment of the present invention as shown in FIG. 5, the head tube 82 has a tapered face 83 in each of the two distal ends thereof for receiving the protruded retaining portion 842 of the outer race 841 of a respective bearing 84. The connecting means according to this embodiment comprises an outer thread 851 extended around the periphery of the steering tube 85, a cap 86 mounted on the periphery of the steering tube 85, and a tapered face 844 formed in the inner race 843 of each bearing 84. The cap 86 has an inner thread 861 threaded onto the outer thread 851 of the steering tube 85, and a tapered face 862, which defines with the axis X of the head tube 82 a 45° contained angle and is maintained closely attached to the tapered face 844 of the top-sided bearing 84. Therefore, the connecting means positively secure the steering tube 85 and the inner race 843 of each bearing 85.

Figure 6:
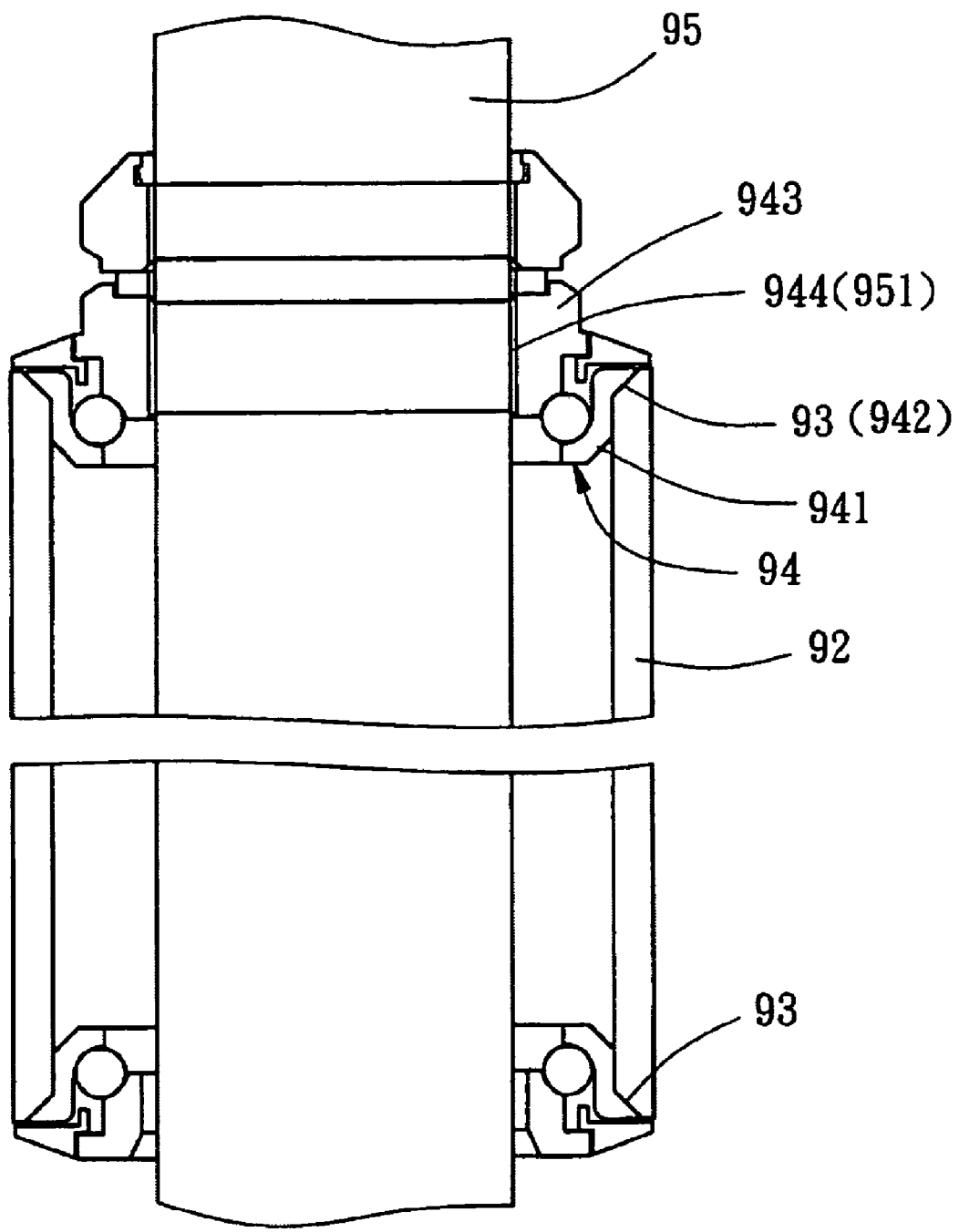
FIG. 6 is a sectional view showing a steering bearing assembly according to a third embodiment of the present invention.
Figure 7:
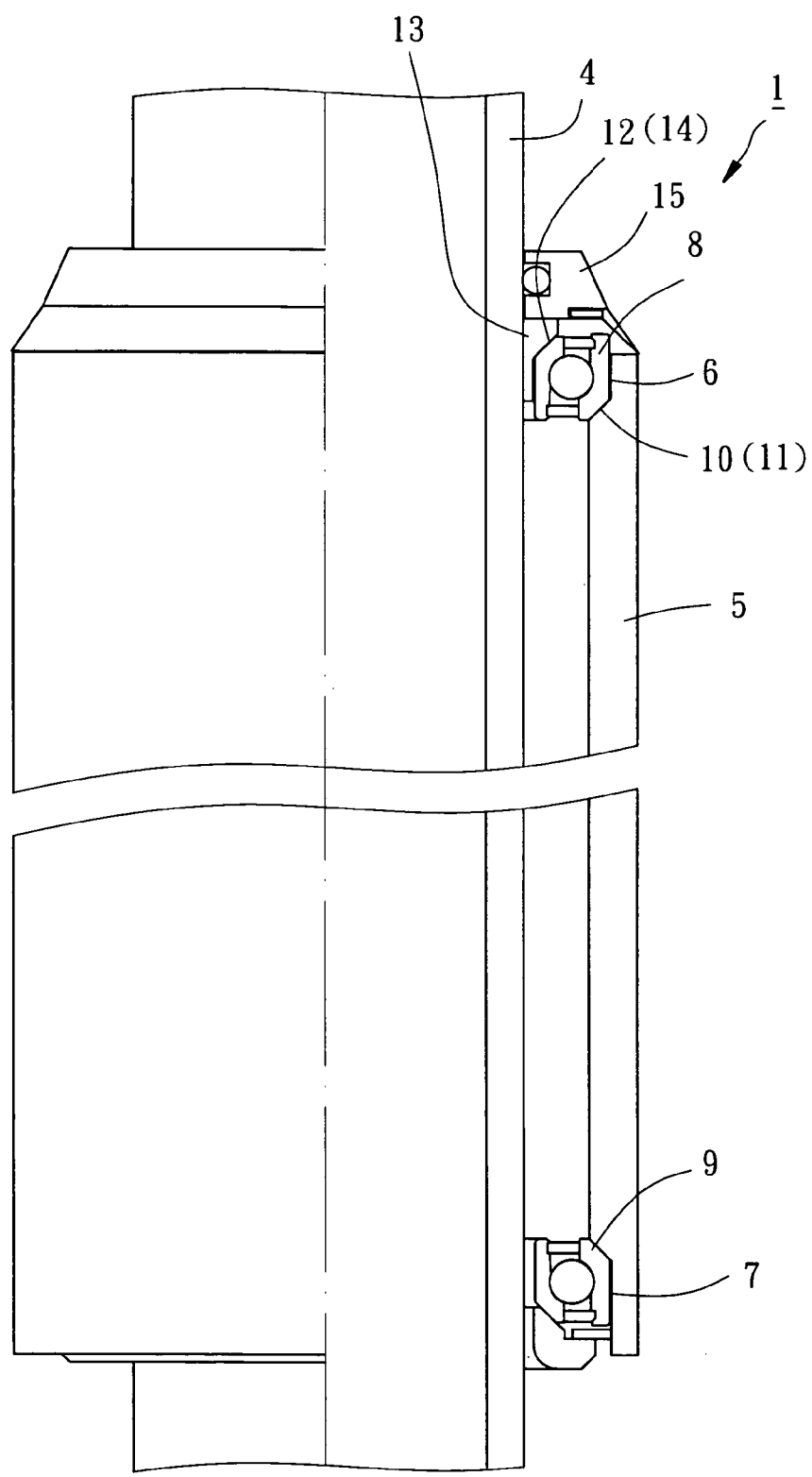
FIG. 7 is a sectional view of a steering bearing assembly according to the prior art.

According to the third embodiment of the present invention as shown in FIG. 6, the head tube 92 has a tapered face 93 in each of the two distal ends thereof for bearing the tapered face 942 of the outer race 941 of a respective bearing 94. The connecting means according to this embodiment comprises outer thread 951 extended around the periphery of the top end of the steering tube 95, and an inner thread 944 formed in the inner race 943 of the top-sided bearing 94 and threaded onto the outer thread 951 of the steering tube 95. This structural design has the cap and the inner race of the top-sided bearing of the aforesaid second embodiment be regarded as one single member.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A steering bearing assembly for a vehicle for connecting a steering tube and a frame of the vehicle, the steering bearing assembly comprising:
   a head tube for mounting on said frame of said vehicle, said head tube having a tapered face which forms a terminal edge at one end of the head tube;
   a bearing mounted in said head tube, said bearing having an outer race, an inner race, and a plurality of balls mounted in between said outer race and said inner race, said outer race having a protruded retaining portion formed as a unit with said outer race, said retaining portion engaged on the tapered face of said head tube; and
   connecting apparatus for connecting the inner race of said bearing and said steering tube together.

2. The steering bearing assembly as defined in claim 1, wherein the retaining portion of the outer race of said bearing has a tapered face engaged on the terminal edge at the one end of said head tube.

3. The steering bearing assembly as defined in claim 1, wherein the tapered face of said head tube defines with an axis of said head tube a contained angle ranging from 30°–60°.

4. The steering bearing assembly as defined in claim 1, wherein said connecting apparatus comprises:
   a compressing ring mounted on a periphery of said steering tube, said compressing ring having a tapered face that defines with an axis of said head tube a contained angle ranging from 30°–60°, and a gap;
   force apparatus exerting a longitudinal force on said compressing ring; and
   a tapered face formed on the inner race of said bearing engaging the tapered face on said compressing ring.

5. The steering bearing assembly as defined in claim 1, wherein said connecting apparatus comprises:
- an outer thread extended around a periphery of said steering tube; and
- an inner thread formed in the inner race of said bearing and threaded onto said outer thread.

6. The steering bearing assembly as defined in claim 1, wherein said connecting apparatus comprises:
- an outer thread extended around a periphery of said steering tube;
- a cap mounted on the periphery of said steering tube, said cap having an inner thread threaded onto said outer thread, and a tapered face that defines with the axis of said head tube a contained angle; and
- a tapered face formed on the inner race of said bearing engaging the tapered face of said cap.

7. The steering bearing assembly as defined in claim 1, wherein said connecting apparatus comprises:
- a crown cone mounted on a periphery of said steering tube, said crown cone having a tapered face that defines with an axis of said head tube a contained angle;
- force apparatus exerting a longitudinal force to said crown cone; and
- a tapered face formed on the inner race of said bearing engaging the tapered face of said crown cone.

8. The steering bearing assembly as defined in claim 1, wherein the retaining portion extends upward above the balls and over the terminal edge at one end of the head tube.

* * * * *